US012680042B2

(12) United States Patent
Jiang et al.

(10) Patent No.:    US 12,680,042 B2
(45) Date of Patent:        Jul. 14, 2026

(54) PROCESS OF CONVERTING HYDROGEN SULFIDE AND CARBON DIOXIDE TO METHANE AND SOLID SULFUR ON CARBON-BASED CATALYSTS UNDER MILDER CONDITIONS WITH REDUCED CARBON FOOTPRINT

(71) Applicant: ARAMCO SERVICES COMPANY, Houston, TX (US)

(72) Inventors: Xiao Jiang, Stoneham, MA (US); Ke Zhang, Stoneham, MA (US); Michael J. Forte, Cambridge, MA (US); Elizabeth Q. Contreras, Houston, TX (US); Sampath Bommareddy, Sugarland, TX (US)

(73) Assignee: SAUDI ARABIAN OIL COMPANY, Dhahran (SA)

( * ) Notice:    Subject to any disclaimer, the term of this patent is extended or adjusted under 35 U.S.C. 154(b) by 216 days.

(21) Appl. No.: 18/495,381

(22) Filed:    Oct. 26, 2023

(65)    Prior Publication Data

US 2025/0136885 A1    May 1, 2025

(51) Int. Cl.
*C10L 3/10*        (2006.01)
*B01J 21/18*        (2006.01)
*C01B 17/04*        (2006.01)

(52) U.S. Cl.
CPC .............. *C10L 3/103* (2013.01); *B01J 21/18* (2013.01); *C01B 17/0404* (2013.01)

(58) Field of Classification Search
CPC .......................... C10L 3/103; C01B 17/0404
See application file for complete search history.

(56)    References Cited

U.S. PATENT DOCUMENTS 3,730,694 A   *   5/1973   Wunderlich ............. C10K 3/04
                                                    518/715
3,870,481 A        3/1975   Hegarty
                    (Continued)

FOREIGN PATENT DOCUMENTS

EP            0112117 A2      6/1984
EP            4 101 815 A1   12/2022
                    (Continued)

OTHER PUBLICATIONS

Tollini et al. Methane Reforming with H2S and Sulfur for Hydrogen Production: Thermodynamic Assessment, Jul. 2023, Energy & Fuels, 37, 11197-11208 (Year: 2023).*
                    (Continued)

*Primary Examiner* — Ellen M Mcavoy
*Assistant Examiner* — Ming Cheung Po
(74) *Attorney, Agent, or Firm* — Osha Bergman Watanabe & Burton LLP

(57)        ABSTRACT

Systems and methods for producing methane and sulfur. A first system includes a condensate separation system to separate a feed stream of mixed hydrocarbons, an acid gas removal system to produce a methane product stream and a reactant gas stream of carbon dioxide and hydrogen sulfide and a catalytic reactor configured to react the carbon dioxide and the hydrogen sulfide from the reactant gas stream using a carbon-based catalyst and produce an effluent methane stream, an effluent sulfur stream, and a waste stream. Another system for producing methane and sulfur includes a first separation system to separate water vapor and oxygen to produce a hydrogen sulfide stream, a catalytic reactor configured to react a separated carbon dioxide stream and the hydrogen sulfide stream using a carbon-based catalyst and produce a methane stream and a sulfur stream.

18 Claims, 3 Drawing Sheets

(56) References Cited

U.S. PATENT DOCUMENTS

| | | | | |
|---|---|---|---|---|
| 4,432,960 | A | 2/1984 | Herrington et al. | |
| 4,999,178 | A | 3/1991 | Bowman | |
| 10,144,878 | B1 | 12/2018 | Kuhn et al. | |
| 11,472,924 | B2 | 10/2022 | Stanis | |
| 2002/0098132 | A1 | 7/2002 | Vidalin | |
| 2012/0279728 | A1* | 11/2012 | Northrop | B01D 53/526 422/612 |
| 2014/0072488 | A1* | 3/2014 | Cooper | B01D 53/64 423/210 |
| 2015/0144840 | A1* | 5/2015 | Valenzuela | C10L 3/104 252/372 |
| 2016/0296878 | A1* | 10/2016 | Zhou | B01D 53/1462 |
| 2018/0282159 | A1 | 10/2018 | Polster et al. | |
| 2021/0339189 | A1 | 11/2021 | Winkler | |
| 2021/0402368 | A1 | 12/2021 | Baek et al. | |
| 2022/0212924 | A1 | 7/2022 | Shahverdi et al. | |

FOREIGN PATENT DOCUMENTS

| | | | |
|---|---|---|---|
| IN | 470392 | | 11/2023 |
| JP | H08-188402 | A | 7/1996 |
| NO | 840523 | A | 8/1985 |
| WO | 2010/102653 | A1 | 9/2010 |
| WO | 2010/150063 | A1 | 12/2010 |
| WO | 2018/127852 | A1 | 7/2018 |
| WO | 2019/002803 | A1 | 1/2019 |

OTHER PUBLICATIONS

S. Sunkara, et al., "Valorization of refinery flue gas through tri-reforming and direct hydrogenization routes," Canadian Journal of Chemical Engineering, vol. 102, No. 6, pp. 2136-2150, 2024 (15 pages).

International Search Report issued for corresponding international application No. PCT/US2025/019523, mailed Jun. 16, 2025 (6 pages).

Written Opinion issued for corresponding international application No. PCT/US2025/019523, mailed Jun. 16, 2025 (13 pages).

J. Liu, et al., "Carbon-based catalysts for Fischer-Tropsch synthesis," Review Article, Royal Society of Chemistry, 2021 (31 pages).

International Search Report issued for corresponding international patent application No. PCT/US2024/050717, mailed Mar. 3, 2025 (6 pages).

Written Opinion issued for corresponding international patent application No. PCT/US2024/050717, mailed Mar. 3, 2025 (9 pages).

El-Melih, A.M. et al., "Hydrogen sulfide reformation in the presence of methane"; Applied Energy; vol. 178; pp. 609-615; Sep. 15, 2016 (7 pages).

Huang, Cunping et al., "Liquid hydrogen production via hydrogen sulfide methane reformation"; Journal of Power Sources; vol. 175, Issue 1; pp. 464-472; Jan. 3, 2008 (9 pages).

Song, Chunshan et al., "Tri-reforming of methane: a novel concept for catalytic production of industrially useful synthesis gas with desired H2/CO ratios"; Catalysis Today; vol. 98, Issue 4; pp. 463-484; Dec. 14, 2004 (22 pages).

Kong, V.C.Y. et al., "Development of hydrogen storage for fuel cell generators. I: Hydrogen generation using hydrolysis hydrides"; International Journal of Hydrogen Energy; vol. 24, Issue 7; pp. 665-675; Jul. 1, 1999 (11 pages).

Maroto-Valer, M. Mercedes et al., "Environmental Challenges and Greenhouse Gas Control for Fossil Fuel Utilization in the 21st Century"; SpringerLink; Chapter 18: Tri-reforming of Natural Gas Using CO2 in Flue Gas of Power Plants without CO2 Pre-separation for Production of Synthesis Gas with Desired H2/CO Ratios; pp. 247-267; 2002 (21 pages).

Song, Chunshan et al., "Tri-reforming of Methane over Ni Catalysts for CO2 Conversion to Syngas With Desired H2/CO Ratios Using Flue Gas of Power Plants Without CO2 Separation"; Studies in Surface Science and Catalysis vol. 153; pp. 315-322; 2004 (8 pages).

Bandosz, T. et al. "Effect of Pore Structure and Surface Chemistry of Virgin Activated Carbons on Removal of Hydrogen Sulfide." Carbon, 1999, vol. 37, pp. 483-491 (9 pages).

Bagreev, A. et al. "On the Mechanism of Hydrogen Sulfide Removal from Moist Air on Catalytic Carbonaceous Adsorbents", Ind. Eng. Chem. Res., 2005, vol. 44, pp. 530-538 (9 pages).

Adib, F. et al., "Effect of Surface Characteristics of Wood-Based Activated Carbons on Adsorption of Hydrogen Sulfide", J. Colloid Interface Sci., 1999, vol. 214, pp. 407-415 (9 pages).

Quan, W. et al., "Influence of Loading a Tertiary Amine on Activated Carbons and Effect of CO2 on Adsorptive H2S Removal from Biogas", ACS Sustainable Chem. Eng., 2020, vol. 8, pp. 9998-10008 (11 pages).

Ma, W, et al., "Achieving simultaneous CO2 and H2S conversion via a coupled solar-driven electrochemical approach on non-precious-metal catalysts", Angew. Chem. Int. Ed. 2018, vol. 57, pp. 3473-3477 (6 pages).

Song, S. "Global challenges and strategies for control, conversion and utilization of CO2 for sustainable development involving energy, catalysis, adsorption and chemical processing", Catalysis Today, 2006, vol. 115, pp. 2-32 (31 pages).

Li. Y, et al., "Kinetic study of decomposition of H2S and CH4 for H2 production using detailed mechanism", ScienceDirect, Energy Procedia, 2017, vol. 142, pp. 1065-1070 (6 pages).

Martínez-Salazar, A.L., et al., "Hydrogen production by methane reforming with H2S using Mo,Cr/ZrO2eSBA15 and Mo,Cr/ZrO2eLa2O3 catalysts", Elsevier, ScienceDirect, n t e rna t i onal journal of hydrogen energy, 2015, vol. 40, pp. 17272-17283 (12 pages).

Shah, M.S., et al., "Hydrogen Sulfide Capture: From Absorption in Polar Liquids to Oxide, Zeolite, and Metal?Organic Framework Adsorbents and Membranes", Chemical Reviews, 2017, vol. 117, pp. 9755-9803 (49 pages).

Xiao, J. et al., "Recent Advances in Carbon Dioxide Hydrogenation to Methanol via Heterogeneous Catalysis", Chemical Reviews, 2020, vol. 120, pp. 7984-8034 (51 pages).

Loeppke, G. E., et al., "Development and Evaluation of a Meter for Measuring Return Line Fluid Flow Rates During Drilling" Sandia Report, SAND 91-2607, Printed Jun. 1992 (131 pages).

* cited by examiner

PROCESS OF CONVERTING HYDROGEN SULFIDE AND CARBON DIOXIDE TO METHANE AND SOLID SULFUR ON CARBON-BASED CATALYSTS UNDER MILDER CONDITIONS WITH REDUCED CARBON FOOTPRINT

BACKGROUND

Acid gases are present in all hydrocarbon streams such as natural gas, biogas, and syngas. Hydrogen sulfide ($H_2S$) and carbon dioxide ($CO_2$) are major acid-gas components in these streams. The presence of acid gases not only can cause safety issues during industrial processing, but acid gas emission also gives rise to environmental concerns. The concentration of $H_2S$ and $CO_2$ in different hydrocarbon sources varies from 1-30 mol % $H_2S$ and 1-40 mol % $CO_2$.

$H_2S$ is highly toxic, corrosive, and flammable. $H_2S$'s acidity can corrode pipelines and equipment, raising safety concerns in industrial processing. Although $CO_2$ is not classified as toxic or harmful, $CO_2$ emissions are linked with environmental concerns. Developing and deploying decarbonization technologies has become a major challenge in the petrochemical industry.

For hydrocarbon streams to be useful and safe for subsequent energy generation and production, acid gases must be reduced to an acceptable level. For example, 5-15 ppm of $H_2S$ is generally acceptable for natural gas, but the accepted range varies between countries. The process of removing acidic sulfuric compounds (primarily $H_2S$) is known as "sweetening".

A conventional example of the sweetening process uses an amine-based scrubbing process to strip $H_2S$ and $CO_2$ from natural gas. The $H_2S$-rich stream then goes into a sulfur recovery unit, i.e., a Claus Unit, to produce solid sulfur by undergoing a high-temperature (ca. 1000° C.) thermal oxidation and a subsequent catalytic oxidation (ca. 200-300° C.). Due to high-temperature operational conditions, the amine-based scrubbing process combined with a Claus Unit is energy-intensive. In addition, "H" in $H_2S$ is more valuable as hydrogen ($H_2$) and methane ($CH_4$) than as water ($H_2O$), which is, however, a main product of the conventional ammine-based scrubbing and Claus Unit process. At the same time, $CO_2$, another acid gas coexisting in the waste streams, is co-fed into the Claus Unit with $H_2S$. Here, $CO_2$ is not separated or retained from waste or other gas mixtures before streaming into a Claus Unit, which is then released into the atmosphere and not recycled after it leaves the Claus Unit. Even if technologies are applicable to separate $CO_2$ from the stream with reduced $H_2S$ concentrations (ca. 0.01-1 mol %) for reutilization, separation process is energy-intensive process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for producing methane and sulfur including a condensate separation system configured to separate a feed stream of mixed hydrocarbons to produce a liquid stream of liquid mixed hydrocarbons and a gas mixture stream of carbon dioxide, methane, and hydrogen sulfide. The system also includes an acid gas removal system configured to separate the gas mixture stream and produce a methane product stream and a reactant gas stream of carbon dioxide and hydrogen sulfide and a catalytic reactor configured to react the carbon dioxide and the hydrogen sulfide from the reactant gas stream using a carbon-based catalyst and produce an effluent methane stream, an effluent sulfur stream, and a waste stream including sulfur dioxide, unreacted carbon dioxide, and unreacted hydrogen sulfide.

In another aspect, embodiments disclosed herein also relate to a method for producing gas and solid sulfur, the method including separating a feed stream of mixed hydrocarbons to produce a liquid stream containing liquid mixed hydrocarbons and a gas mixture stream containing carbon dioxide, methane, and hydrogen sulfide. The method further includes separating the gas mixture stream using an acid gas removal system to produce a methane product stream and a reactant gas stream, where the reactant gas stream contains carbon dioxide and hydrogen sulfide and reacting the carbon dioxide and the hydrogen sulfide from the reactant gas stream in a catalytic reactor using a carbon-based catalyst, producing an effluent methane stream, an effluent sulfur stream, and a waste stream, where the waste stream includes produced sulfur dioxide, unreacted carbon dioxide and unreacted hydrogen sulfide.

In yet another aspect, embodiments disclosed herein relate to a system for producing methane and sulfur including a first separation system configured to receive an inlet gas stream comprising methane, hydrogen sulfide, water vapor, and oxygen and separate the water vapor and the oxygen to produce a separated hydrogen sulfide stream including a first portion of separated hydrogen sulfide and a second portion of separated hydrogen sulfide, a separated methane stream, and a separated carbon dioxide stream. The system also includes a catalytic reactor configured to react the separated carbon dioxide stream and the first portion of separated hydrogen sulfide using a carbon-based catalyst, producing a produced methane stream and a produced sulfur stream.

Other aspects and advantages of the claimed subject matter will be apparent from the following description and the appended claims.

DETAILED DESCRIPTION

Figure 1:
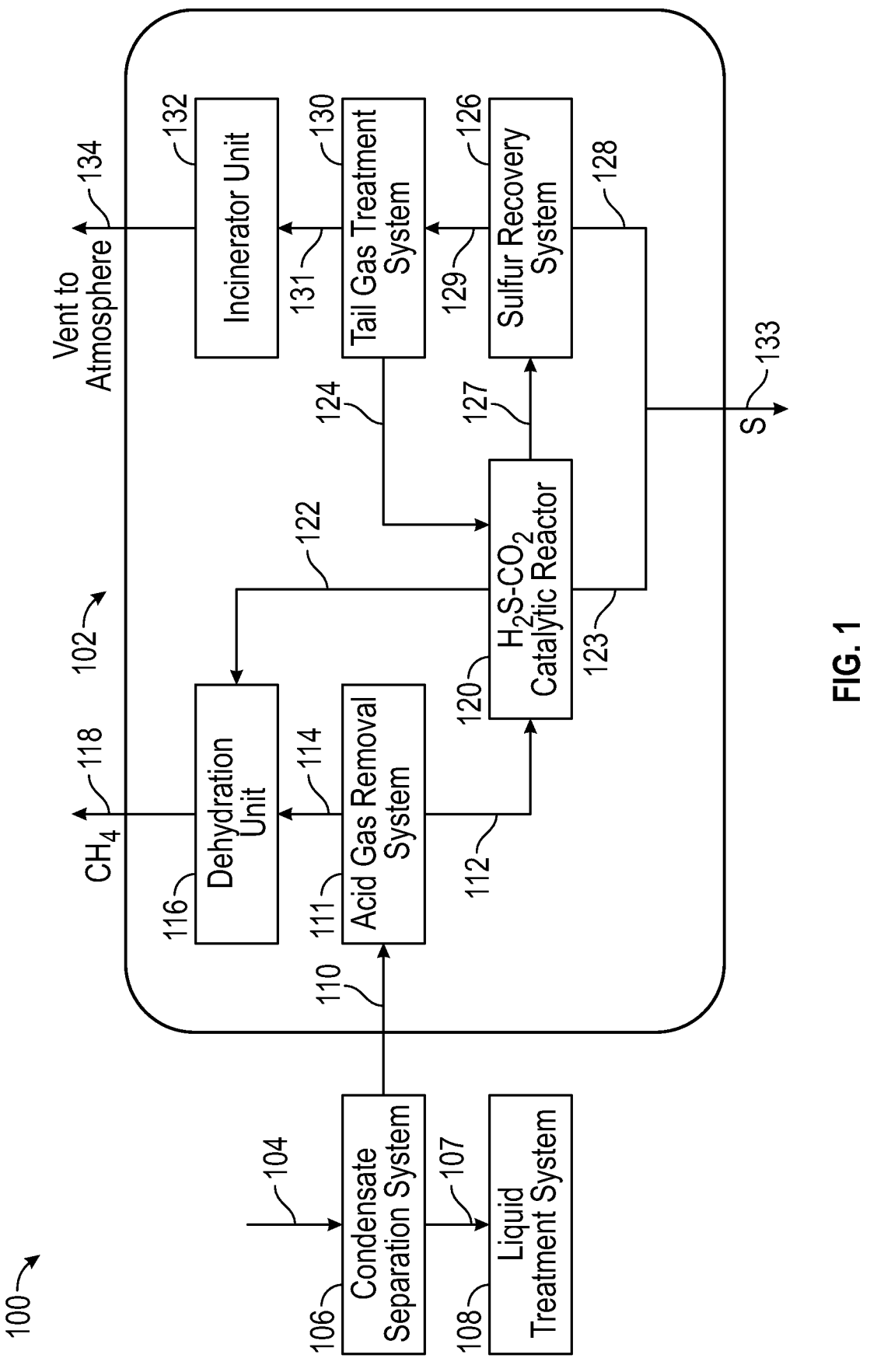
FIG. 1 shows a system for reacting $CO_2$ and $H_2S$ to produce $CH_4$ in accordance with one embodiment.

The energy-intensive and non-environmentally friendly conventional approach to separate $H_2S$ and $CO_2$ from natural gas, such as the examples discussed above, may be improved upon by a process that enables the recycling of these acid gases from waste streams. The improved process could reduce carbon footprint and improve element economy for sustainability.

Conventionally, a high-temperature amine-based scrubbing process combined with a Claus Unit is used to separate and recycle $H_2S$ from natural gas in a natural gas refining plant. The main products are solid sulfur, sulfur oxides ($SO_x$), and $H_2$). At the same time, $CO_2$ is co-fed with $H_2S$ into the Claus Unit. Conventionally, $CO_2$ is not separated or retained from waste or other gas mixtures before streaming into a Claus Unit, and the $CO_2$ is then released into the atmosphere and not recycled after it leaves the Claus Unit. Proposed herein is a system to produce $CH_4$ and solid sulfur by $H_2S$—$CO_2$ reaction which, when combined with a Claus Unit in a natural gas refining plant, may reduce carbon footprint by operating at a lower temperature and pressure than conventional Claus operations and by recycling $CO_2$ which is normally released into the atmosphere.

For example, $H_2S$ oxidation occurs during $H_2S$ adsorption on virgin carbonaceous sorbents, and the production of $CH_4$ and solid sulfur has been reported on activated carbons. However, there is no current development that focuses on clarifying the reaction between $H_2S$ and $CO_2$ (e.g., other potential products in addition to $CH_4$ and solid sulfur) or on examining potential applications in petrochemical industry (e.g., a complement unit prior to a Claus Unit).

Proposed herein is a $H_2S$—$CO_2$-reaction process to convert $H_2S$ and $CO_2$ to $CH_4$ and solid sulfur under milder conditions. The proposed $H_2S$—$CO_2$-reaction could be considered as a complement to a Claus Unit or any other proposed approaches that are dedicated to the recycling of "H" from $H_2S$ and "C" from $CO_2$ waste streams in the form of "$CH_4$" while producing solid sulfur in an energy-efficient manner. The proposed $H_2S$—$CO_2$-reaction process could also assist in other proposed novel routes of utilizing $H_2S$ for sustainability, such as $H_2S$ reforming with $CH_4$ to produce $H_2$. Specifically, the proposed $H_2S$—$CO_2$-reaction process provides an additional $CH_4$ source and excess energy. The proposed $H_2S$—$CO_2$-reaction process recycles waste streams with environmental benefits by reducing the carbon footprint and with credits for sustainability. Valorization of the reaction, proposed catalysts, and potential applications in petrochemical industry are elaborated in the following sections.

In general, embodiments disclosed herein relate to a method for producing $CH_4$ gas and solid sulfur by reacting a gas mixture of at least $CO_2$ and $H_2S$ using a carbon-based catalyst. Embodiments disclosed herein also relate to systems for producing $CH_4$ gas and solid sulfur by reacting a gas mixture of at least $CO_2$ and $H_2S$ using a carbon-based catalyst.

Figure 2:
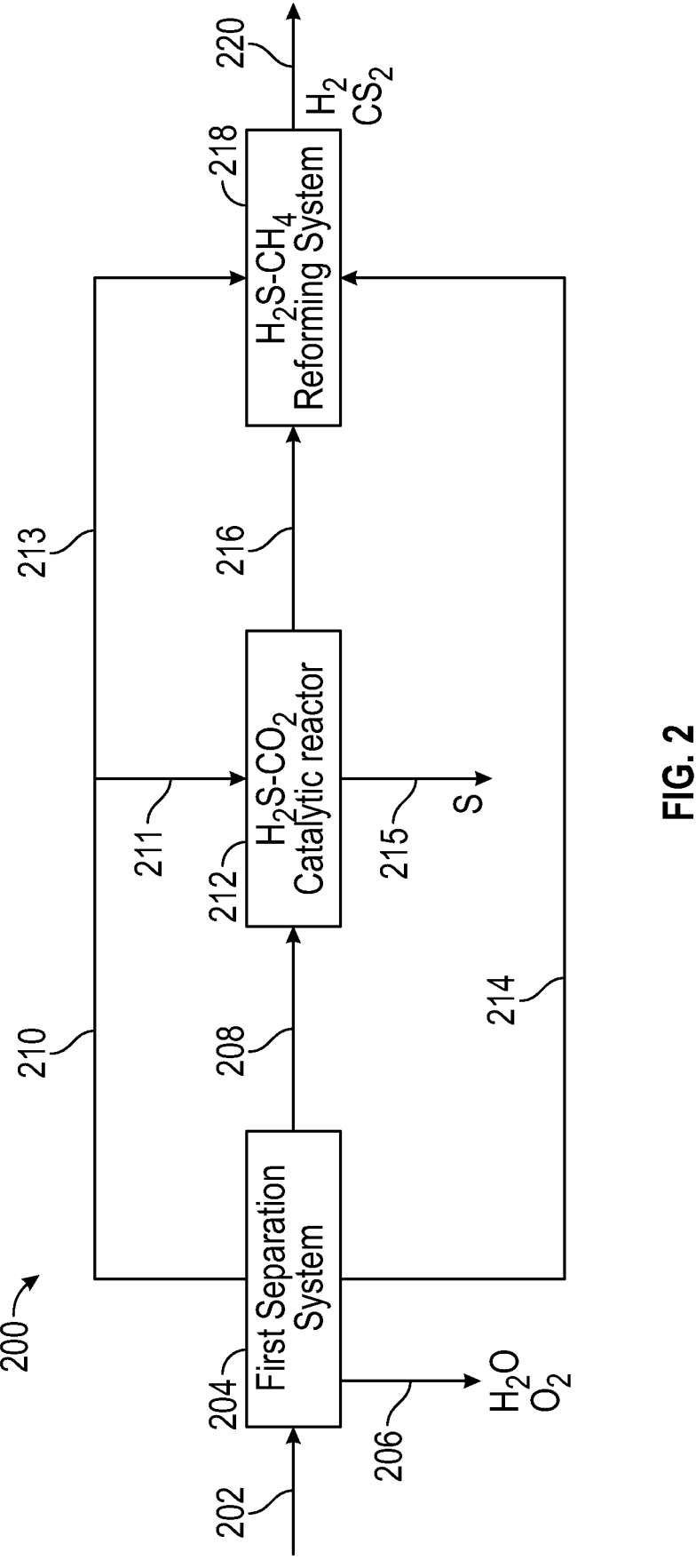
FIG. 2 shows a system for reacting $CO_2$ and $H_2S$ to produce $CH_4$ in accordance with one embodiment.

$H_2S$—$CO_2$ Reaction Process $H_2S$ oxidation on carbon-based sorbents has been reported in literature. For example, Adib et al., have reported the occurrence of $H_2S$ oxidation on virgin carbons and proposed mechanisms and correlations with the local pH values of carbons (J. Colloid Interf. Sci. 1999, 214, 407). As shown in FIG. 2 of Adib et al., at a medium strength of acidity, highly dispersed sulfur atoms ($S_x$) may form through step-by-step oxidations with the aid of oxygen ($O_2$), while polysulfides [$C(S_x)$] may form when the pH is more basic (less acidic).

Another example shows $H_2S$ conversion to $CH_4$ on carbon-based catalyst materials in the presence of $CO_2$. The formation of $CH_4$ and solid sulfur on activated carbon sorbents during the coadsorption of $H_2S$ and $CO_2$ under milder conditions (e.g., room temperature and ambient pressure) has been demonstrated by Quan, et al. (ACS Sustainable Chem. Eng. 2020, 8, 9998). As shown in FIG. 7B of Quan, et al, in situ Flourier-Transform Infrared Spectroscopy (FT-IR) spectra show the formation of $CH_4$, as evidenced from the peaks centered at 3016 and 1305 $cm^{-1}$. By contrast, the peak of $CH_4$ is absent in the absence of $CO_2$ during $H_2S$ adsorption (FIG. 7A of Quan, et al.). FIGS. 6A and 6B of Quan, et al, shows Thermogravimetric analysis (TGA)-Mass Spectroscopy (MS) spectra [solid sulfur (m/z=32) in FIG. 6A of Quan, et al., sulfur oxide (m/z=48) in FIG. 6B of Quan, et al,] of spent activated carbons (AC) collected post $H_2S$ adsorption in the absence and presence of $CO_2$, as well as that of fresh AC as a reference. Clearly, sulfur(S) and sulfur oxide (SO) are formed on the spent AC sorbent. In addition, the SO peak of spent AC in the presence of $CO_2$ is significantly higher than that of spent AC in the absence of $CO_2$, implying that $CO_2$ reacts with $H_2S$ during coadsorption.

Reactive gases like $H_2S$ and $CO_2$ can catalytically produce $CH_4$, sulfur, and $H_2O$ based on the identified reagents and products, as well as the elemental balance as shown in Equation 1, below. Thermodynamic calculations show that, in comparison to $H_2S$ decomposition (see Equation 2, below) and $H_2S$ reforming with $CH_4$ (see Equation 3, below), the proposed $H_2S$—$CO_2$ reaction is slightly endothermic; although it is not spontaneous, the proposed $H_2S$—$CO_2$ reaction's Gibbs free energy is lower than those of both $H_2S$—$CH_4$ reforming and $H_2S$ decomposition below 600° C. Clearly, in addition to the additional reagent source, this $H_2S$—$CO_2$ reaction could also provide excess energy for the conventional reforming unit for carrying out the reaction according to Equation 3, benefiting the integrated $H_2S$—$CO_2$ reactor with lower energy input and reduced carbon footprint.

$$4H_2S + CO_2 = CH_4 + 2H_2O + 2S_2 \qquad \text{Equation (1)}$$

$$2H_2S = 2H_2 + S_2 \qquad \text{Equation (2)}$$

$$2H_2S + CH_4 = 4H_2 + CS_2 \qquad \text{Equation (3)}$$

Observations from the literature demonstrate that there exists a reaction between $H_2S$ and $CO_2$ during the coadsorption under milder conditions, and $CH_4$ and solid sulfur are verifiably produced based on provided results. Oxygen-containing functional groups on various carbon materials are potential active sites to catalyze the reaction. Based on the above findings, a conversion system may be added prior to a Claus Unit as a complement to recycle "H" from $H_2S$ and "C" from $CO_2$ in the form of $CH_4$ under milder conditions by utilizing cost-effective carbon materials as catalysts. Mass balance indicates that stoichiometrically, 25 kg of $CO_2$ in the $H_2S$—$CO_2$ reaction produces 9.1 kg of $CH_4$.

Method for Producing $CH_4$ and Sulfur by $H_2S$—$CO_2$ Reaction

One or more embodiments relates to a method for producing $CH_4$ gas and solid sulfur, the method including obtaining a reactant gas mixture, where the reactant gas mixture includes $CO_2$ and $H_2S$, and contacting the reactant gas mixture with a carbon-based catalyst under conditions sufficient to produce $CH_4$ and solid sulfur. The reaction in the method for producing $CH_4$ gas and solid sulfur is hereby referred to as the "$H_2S$—$CO_2$ reaction".

In one or more embodiments, the reactant gas mixture includes $CO_2$ and $H_2S$. The reactant gas mixture may also include other fluids, including but not limited to $H_2O$, nitrogen gas ($N_2$), oxygen gas ($O_2$), and various hydrocarbons such as $CH_4$, ethane, and other light alkanes. The reactant gas mixture may be obtained from one or more of oil and gas wells, and compositions, therefore, may vary.

In one or more embodiments, the catalyst for the $H_2S$—$CO_2$ reaction is a carbon-based catalyst. The carbon-based catalyst may be, for example, activated carbon, carbon black, carbon fibers, carbon nanotubes, or combinations therein.

In one or more embodiments, the reactor used to perform the $H_2S$—$CO_2$ reaction may be any reactor known in the art. For example, the reactor may be a batch reactor, a packed bed reactor, a continuous flow reactor such as a fluidized reactor or plug flow reactor, and the like.

In one or more embodiments, the reactant gas mixture is contacted with the carbon-based catalyst under conditions sufficient to produce $CH_4$ and solid sulfur. Conditions sufficient to produce $CH_4$ and solid sulfur are summarized in Table 1, below, and include reacting the reactant gas mixture at a ratio of 1:2 $CO_2$ to $H_2S$, a temperature in a range of from 50° C. to 150° C., and a pressure in a range of from 100 kPa to 5000 kPa.

In one or more embodiments, the ratio of $CO_2$ to $H_2S$ in the reactant gas mixture is 1:2. For example, the ratio may be 1:2.1, 1:2.2, 1:2.3, 1.1:2, 1.2:2, and 1.2:2.

In one or more embodiments, reacting the reactant gas mixture occurs at a temperature in a range of from 50° C. to 150° C., such as a lower limit selected from any one of 50, 55, 60, 65, and 70° C., to an upper limit selected from any one of 75, 100, 125, and 150° C., where any lower limit may be paired with any upper limit.

In one or more embodiments, reacting the reactant gas mixture occurs at a pressure in a range of from 100 kPa to 5000 kPa, such as a lower limit selected from any one of 100, 200, 500, and 1000 kPa, to an upper limit selected from any one of 2000, 3000, 4000, and 5000 kPa where any lower limit may be paired with any upper limit.

TABLE 1

| Operational parameters | Value ranges |
| --- | --- |
| Temperatures | 50-150° C. |
| Pressures | 100-5000 kPa |
| $CO_2$/$H_2S$ ratios | 1:2 |
| Catalyst | Activated carbons |

Systems for $H_2S$—$CO_2$ Reaction

One or more embodiments also relate to a system for producing $CH_4$ and solid sulfur by reacting a reactant gas stream of $CO_2$ and $H_2S$ in the presence of a carbon-based catalyst. The $H_2S$—$CO_2$ reaction and method to produce $CH_4$ and solid sulfur described above may be completed alone or in combination with existing systems or processes and may provide the advantage of recycling valuable elements and reducing carbon footprint.

FIG. 1 illustrates a system for producing $CH_4$ and sulfur by the $H_2S$—$CO_2$ reaction. In the system 100 of FIG. 1, a feed stream 104 sourced from any suitable location. For example, the feed stream 104 may be a mixed hydrocarbon stream sourced from an oil and gas well. The feed stream 104 is sent to a condensate separation system 106, which separates the feed stream 104 into a liquid mixed hydrocarbons stream 107 and a gas mixture stream 110. The gas mixture stream 110 may be a mixture of $CO_2$, $CH_4$, and $H_2S$.

In one or more embodiments, the liquid mixed hydrocarbons stream 107 is sent to a liquid treatment system 108 for further refinement.

Keeping with FIG. 1, The gas mixture stream 110 may then enter an acid gas removal system 111. The acid gas removal system 111 separates the gas mixture stream 110 into a $CH_4$ product stream 114 and a reactant gas stream 112, where the reactant gas stream 112 contains $H_2S$ and $CO_2$. In one or more embodiments, the acid gas removal system 111 is part of a natural gas refining system, as indicated by 102 in FIG. 1.

In one or more embodiments, the acid gas removal system 111 may be any acid gas removal system known in the art. Conventionally, acid gas removal systems include absorption of the acid gas or gases using a regenerative solvent in a scrubbing column. Examples of acid gas systems include physical solvent systems such as Rectisol and Selexol systems, chemical solvents systems, such as methyldiethanolamine (MDEA), or mixtures of chemical and physical solvent systems, such as Sulfinol systems.

In one or more embodiments, the $CH_4$ product stream 114 may be sent to a dehydration unit 116 for further refinement. Upon dehydration in the dehydration unit 116, a dehydrated $CH_4$ 118 is produced and may be sold as a final product or sent to the gas pipeline, for example.

In one or more embodiments, the dehydration unit 116 may be any dehydration known in the art. Conventionally, natural gas dehydration systems include solvent absorption, solid adsorption, and low temperature separation, for example. The solvent absorption method is the most commonly used for the dehydration of natural gas, in which the solvent is a glycol compound.

Keeping with FIG. 1, the reactant gas stream 112 is sent to a catalytic reactor 120 where the $H_2S$—$CO_2$ reaction to convert $H_2S$ and $CO_2$ to $CH_4$ and sulfur under milder conditions of one or more embodiments occurs. The catalytic reactor 120 reacts $H_2S$ and $CO_2$ from the reactant gas stream 112, producing a sulfur effluent stream 123, a $CH_4$ effluent stream 122, and a waste stream containing $H_2S$, $CO_2$, and sulfur dioxide ($SO_2$) 127. The $CH_4$ effluent stream 122 may also be sent to the dehydration unit 116.

The waste stream containing $H_2S$, $CO_2$, and sulfur dioxide ($SO_2$) 127 may then be sent to a sulfur recovery system 126. The sulfur recovery system produces an effluent stream containing $H_2S$, $CO_2$, and $SO_2$ 129 and a recovered sulfur stream 128.

The recovered sulfur stream 128 may be combined with the sulfur effluent stream 123 into a sulfur product stream 133 and further refined or sold.

In one or more embodiments, the sulfur product stream may be used as reagent in producing sulfuric acid, soil management as fertilizers, manufacturing (vulcanized rubber, building materials, inorganic chemicals, dyes, skin treatment ointments, explosives, agrochemicals, and fungicides), paper industry (paper bleaching), and wastewater treatment.

In one or more embodiments, the catalytic reactor 120 used for the $H_2S$—$CO_2$ reaction may be the reactor as described in the method section, above.

In one or more embodiments, the sulfur recovery system 126 may be any suitable system which extracts sulfur from a gas stream, such as a Claus Unit.

Claus Unit reactions include the following. In a first step, the thermal oxidation reaction of $H_2S$ occurs at temperatures around 1000° C., producing $SO_2$ and $H_2O$. Then, the catalytic oxidation reaction of $H_2S$ and $SO_2$ produces solid sulfur and $H_2O$ at temperatures around 200-300° C. A conventional Claus Unit has a sulfur recovery rate of about 95% to 97%, therefore the effluent stream containing $H_2S$, $CO_2$, and $SO_2$ 129 contains small amounts of sulfur and $CO_2$.

Keeping with FIG. 1, the effluent stream containing $H_2S$, $CO_2$, and $SO_2$ 129 produced from the sulfur recovery system 126 may be sent to a tail gas treatment system 130. The tail gas treatment system 130 produces a recycle stream con-

7 taining H₂S and CO₂ 124 and a residual SO₂ stream 131. The recycle stream containing H₂S and CO₂ 124 may be fed back into the catalytic reactor 120 for a continuous production of CH₄ effluent stream 122 and recovered sulfur stream 128 with reduced carbon footprint.

In one or more embodiments, the residual SO₂ stream 131 may be sent to an incinerator 132 before being vented to atmosphere 134.

In one or more embodiments, the tail gas treatment system 130 may be any suitable system which converts sulfur species to H₂S, such as a Shell Claus Off-gas Treatment tail gas treating unit.

In one embodiment, a system for producing CH₄ and solid sulfur by H₂S—CO₂ reaction may combine the method to produce CH₄ and solid sulfur by H₂S—CO₂ reaction, as described above, with an H₂S—CH₄ reforming system to produce H₂.

H₂ is a useful and sustainable energy source. Systems to reform acid gases such as H₂S, and hydrocarbons such as CH₄ to H₂ are known, for example the steam reforming system. Proposed herein is a system useful for improving processes such as the steam reforming system to convert H₂S and CH₄ to produce H₂. Illustrated in FIG. 2, the system presented herein may reduce carbon footprint by increasing the inclusion of H₂S—CO₂ reaction of one or more embodiments to yield energy and feedstock for the H₂S—CH₄ reforming system.

In conventional steam reforming operations, a dedicated CO₂ removal system is needed for the mixed gas stream prior to the unit of the catalytic reforming reaction of H₂S and CH₄. However, stripped CO₂ is not recycled in the conventional process. These deficiencies might increase the total energy consumption of the conventional process, as well as the carbon footprint. In this context, the H₂S—CO₂ reaction of one or more embodiments may be incorporated prior to the conventional reforming unit to provide additional CH₄ feedstock for the reforming unit.

In FIG. 2, an inlet gas stream 202, containing CH₄, H₂S, H₂O and O₂ enters a first separation system 204. The first separation system 204 receives the inlet gas stream 202, separating a separated CO₂ stream 208, a separated H₂S stream 210, a separated CH₄ stream 214, from other fluids such as a H₂O and O₂ stream 206. The separated H₂S stream 210 is split into a first portion of separated H₂S 211 and a second portion of separated H₂S 213.

Keeping with FIG. 2, a catalytic reactor 212 configured to react H₂S and CO₂ receives the first portion of H₂S 211 and the separated CO₂ stream 208 in the presence of a carbon-based catalyst. The H₂S—CO₂ reaction occurs in the catalytic reactor 212, producing a produced sulfur stream 215 and a produced CH₄ stream 216. The produced sulfur stream 215 may be sent for further refinement or sold as an end product.

In one or more embodiments, an H₂S—CH₄ reforming system 218 is downstream of the catalytic reactor 212. The H₂S—CH₄ reforming system 218 may receive the second portion of separated H₂S and the produced CH₄ stream 216 produced from the catalytic reactor 212. The products of the H₂S—CH₄ reforming system 218 are H₂ and CS₂, as shown in stream 220.

In one or more embodiments, the catalytic reactor 212 used for the H₂S—CO₂ reaction may the reactor as described in the method section with respect to FIG. 1.

In one or more embodiments, the H₂S—CH₄ reforming system may be any H₂S—CH₄ reforming system known in the art.

The temperature range for the H₂S—CH₄ reforming system of one or more embodiments is in a range of from about 800° C. to about 1200° C. (Energy. Proced. 2017, 142, 1065 and Int. J. Hydrogen Energ. 2015, 40, 17272).

The pressure for the H₂S—CH₄ reforming system of one or more embodiments is in a range of from about 20 kPa to about 100 kPa. (Int. J. Hydrogen Energ. 2015, 40, 17272).

Thermodynamically, a higher CH₄ composition is more favorable to obtain a higher equilibrium H₂S conversion than a lower CH₄ partial pressure, as well as higher equilibrium amounts of H₂ and CS₂. However, considering the CH₄-induced coking, H₂S composition is suggested to be equal or higher than CH₄. Therefore, the H₂S to CH₄ ratio for the H₂S—CH₄ reforming system of one or more embodiments is in a range of from about 1:1 to about 1:5 (Int. J. Hydrogen Energ. 2015, 40, 17272).

Figure 3A:
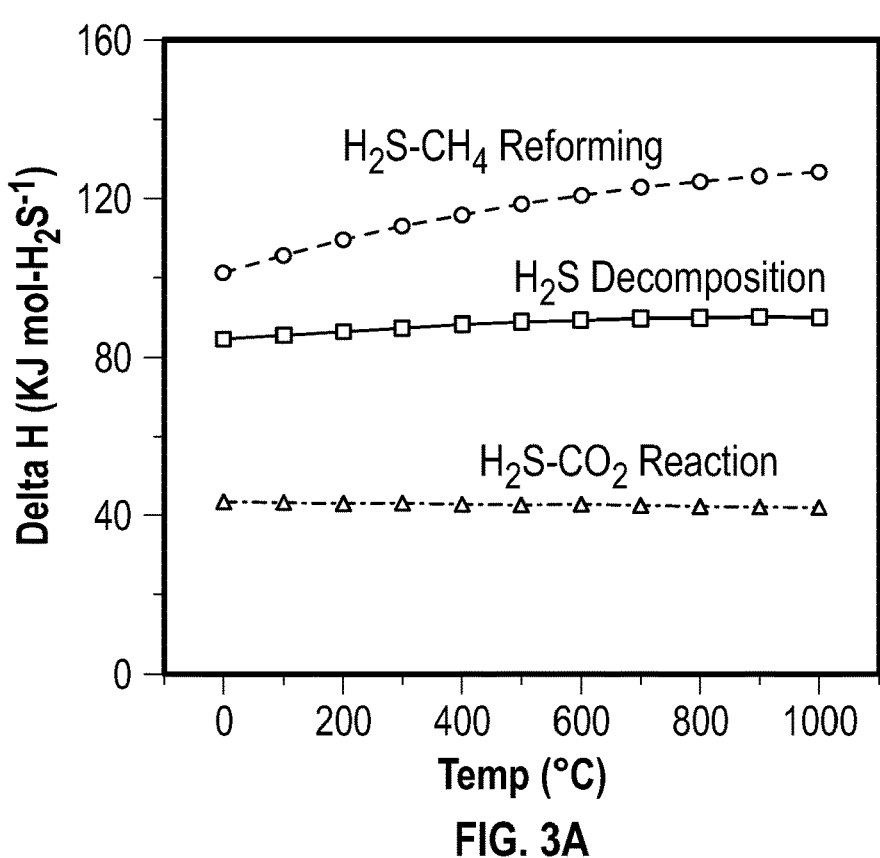
FIG. 3A shows a comparison of delta enthalpy for various reactions considered in one or more embodiments.
Figure 3B:
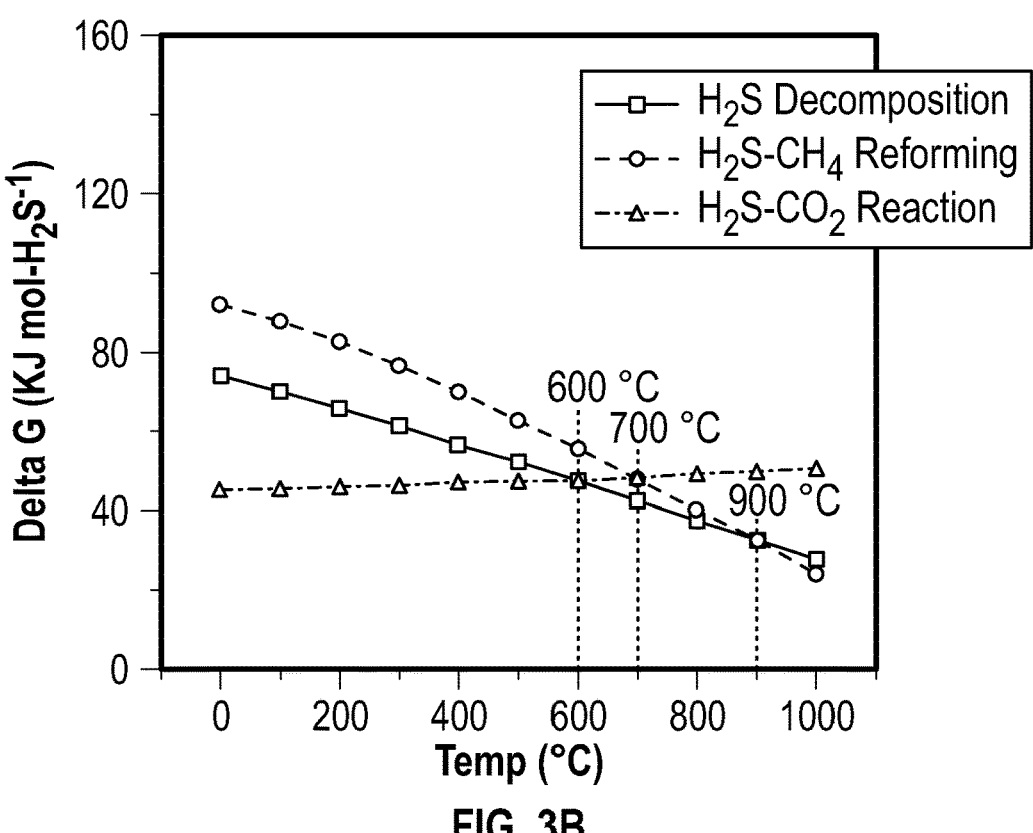
FIG. 3B shows a comparison of delta Gibbs free energy for various reactions considered in one or more embodiments.

FIG. 3 shows a comparison of delta enthalpy (FIG. 3A) and Gibbs free energy (FIG. 3B) for the reactions considered in one or more embodiments. FIG. 3A compares delta enthalpy for a conventional H₂S—CH₄ reforming reaction, an H₂S decomposition reaction, and the H₂S—CO₂ reaction of one or more embodiments. Compared to H₂S decomposition and H₂S—CH₄ reforming, the H₂S—CO₂ reaction of one or more embodiments is slightly endothermic, as shown by the slightly negative slope in for the H₂S—CO₂ reaction curve in FIG. 3A. FIG. 3B compares delta Gibbs free energy for a conventional H₂S—CH₄ reforming reaction, an H₂S decomposition reaction, and the H₂S—CO₂ reaction of one or more embodiments. Although the H₂S—CO₂ reaction of one or more embodiments is not a spontaneous reaction, the H₂S—CO₂ reaction of one or more embodiments has a lower Gibbs free energy compared to a H₂S—CH₄ reforming reaction and an H₂S decomposition reaction below 600° C., as shown in FIG. 3B. In addition, the H₂S—CO₂ reaction of one or more embodiments could provide excess energy for a conventional H₂S—CH₄ reforming system, leading to lower energy input and reduced carbon footprint when compared to the conventional H₂S—CH₄ reforming system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A system for producing methane and sulfur, comprising:

a condensate separation system configured to separate a feed stream comprising mixed hydrocarbons to produce a liquid stream comprising liquid mixed hydrocarbons and a gas mixture stream comprising carbon dioxide, methane, and hydrogen sulfide;

an acid gas removal system configured to separate the gas mixture stream and produce a methane product stream and a reactant gas stream comprising carbon dioxide and hydrogen sulfide;

a catalytic reactor configured to react the carbon dioxide and the hydrogen sulfide from the reactant gas stream using a carbon-based catalyst and produce an effluent methane stream, an effluent sulfur stream, and a waste stream comprising sulfur dioxide, unreacted carbon dioxide, and unreacted hydrogen sulfide;

a sulfur recovery system downstream of the catalytic reactor configured to receive the waste stream and produce an effluent stream comprising hydrogen sulfide, carbon dioxide and sulfur dioxide and a recovered sulfur stream;

a tail gas treatment system downstream of the sulfur recovery system configured to receive the effluent stream comprising hydrogen sulfide, carbon dioxide and sulfur dioxide and produce a recycle stream comprising hydrogen sulfide and carbon dioxide and a residual sulfur dioxide stream;

an incinerator unit downstream of the tail gas treatment system configured to incinerate the residual sulfur dioxide stream before venting to atmosphere; and a hydrogen sulfide-methane reforming system downstream of the catalytic reactor configured to receive the methane product stream and a portion of the waste stream comprising sulfur dioxide, unreacted carbon dioxide, and unreacted hydrogen sulfide.

2. The system of claim 1, wherein the sulfur recovery system comprises a Claus unit.

3. The system of claim 1, further comprising:

a dehydration unit downstream of the acid gas removal system configured to dehydrate the methane product stream and the effluent methane stream to produce a dehydrated methane stream.

4. The system of claim 1, wherein the acid gas removal system comprises an amine scrubbing unit.

5. The system of claim 1, further comprising a liquid treatment system configured to receive and treat the liquid stream.

6. The system of claim 1, wherein the acid gas removal system and the catalytic reactor are part of a natural gas refining system.

7. The system of claim 1, wherein the carbon-based catalyst comprises activated carbon.

8. The system of claim 1, wherein the catalytic reactor is operated at a temperature in a range from 50° C. to 150° C.

9. The system of claim 1, wherein the catalytic reactor is operated at a pressure in a range from 100 kPa to 5,000 kPa.

10. The system of claim 1, wherein the catalytic reactor is operated at a ratio of 1:2 $CO_2$ to $H_2S$ from the reactant gas stream.

11. A method for producing methane gas and solid sulfur, comprising:

separating a feed stream comprising mixed hydrocarbons to produce a liquid stream comprising liquid mixed hydrocarbons and a gas mixture stream comprising carbon dioxide, methane, and hydrogen sulfide;

separating the gas mixture stream using an acid gas removal system to produce a methane product stream and a reactant gas stream, wherein the reactant gas stream comprises carbon dioxide and hydrogen sulfide;

reacting the carbon dioxide and the hydrogen sulfide from the reactant gas stream in a catalytic reactor using a carbon-based catalyst, producing an effluent methane stream, an effluent sulfur stream, and a waste stream, wherein the waste stream comprises produced sulfur dioxide, and unreacted carbon dioxide and unreacted hydrogen sulfide;

producing an effluent stream comprising hydrogen sulfide, carbon dioxide and sulfur dioxide and a recovered sulfur stream using a sulfur recovery system downstream of the catalytic reactor configured to receive the waste stream;

receiving the effluent stream comprising hydrogen sulfide, carbon dioxide and sulfur dioxide and producing a recycle stream comprising hydrogen sulfide and carbon dioxide and a residual sulfur dioxide stream using a tail gas treatment system downstream of the sulfur recovery system;

incinerating the residual sulfur dioxide stream before venting to atmosphere using an incinerator unit downstream of the tail gas treatment system; and receiving, with a hydrogen sulfide-methane reforming system downstream of the catalytic reactor, the methane product stream and a portion of the waste stream comprising sulfur dioxide, unreacted carbon dioxide, and unreacted hydrogen sulfide.

12. The method of claim 11, further comprising:

dehydrating the methane product stream and the effluent methane stream using a dehydration unit downstream of the acid gas removal system to produce a dehydrated methane stream.

13. The method of claim 11, further comprising receiving and treating the liquid stream using a liquid treatment system.

14. A system for producing methane and sulfur, comprising:

a first separation system configured to receive an inlet gas stream comprising methane, hydrogen sulfide, water vapor, and oxygen and separate the water vapor and the oxygen to produce a separated hydrogen sulfide stream comprising a first portion of separated hydrogen sulfide and a second portion of separated hydrogen sulfide, a separated methane stream, and a separated carbon dioxide stream;

a catalytic reactor configured to react the separated carbon dioxide stream and the first portion of separated hydrogen sulfide using a carbon-based catalyst, producing a produced methane stream and a produced sulfur stream; and a hydrogen sulfide-methane reforming system downstream of the catalytic reactor configured to receive the produced methane stream, and the second portion of separated hydrogen sulfide.

15. The system of claim 14, wherein the carbon-based catalyst comprises activated carbon.

16. The system of claim 14, wherein the catalytic reactor is operated at a temperature in a range from 50° C. to 150° C.

17. The system of claim 14, wherein the catalytic reactor is operated at a pressure in a range from 20 kPa to 100 kPa.

18. The system of claim 14, wherein the catalytic reactor is operated at a ratio of 1:2 $CO_2$ to $H_2S$ from the inlet gas stream.

* * * * *